United States Patent
Levin

(10) Patent No.: US 11,941,224 B2
(45) Date of Patent: Mar. 26, 2024

(54) SINGLE FINGER USER INTERFACE CAMERA CONTROL

(71) Applicant: Topgolf International, Inc., Dallas, TX (US)

(72) Inventor: Brett Jason Levin, Mill Valley, CA (US)

(73) Assignee: TopGolf International, Inc., Dallas, TX (US)

( * ) Notice: Subject to any disclaimer, the term of this patent is extended or adjusted under 35 U.S.C. 154(b) by 0 days.

(21) Appl. No.: 18/205,459

(22) Filed: Jun. 2, 2023

(65) Prior Publication Data

US 2023/0315254 A1 Oct. 5, 2023

Related U.S. Application Data

(63) Continuation of application No. 17/867,485, filed on Jul. 18, 2022, now Pat. No. 11,703,997, which is a continuation of application No. 17/200,655, filed on Mar. 12, 2021, now Pat. No. 11,409,411.

(51) Int. Cl.
| | |
|---|---|
| *G06F 3/04817* | (2022.01) |
| *G06F 1/16* | (2006.01) |
| *G06F 3/03* | (2006.01) |
| *G06F 3/16* | (2006.01) |

(52) U.S. Cl.
CPC ........ *G06F 3/04817* (2013.01); *G06F 1/1626* (2013.01); *G06F 3/0304* (2013.01)

(58) Field of Classification Search
CPC ... G06F 3/04817; G06F 1/1626; G06F 3/0304
See application file for complete search history.

(56) References Cited

U.S. PATENT DOCUMENTS

| | | | |
|---|---|---|---|
| 7,620,316 | B2 | 11/2009 | Boillot |
| 8,472,665 | B2 | 6/2013 | Hildreth |
| 8,854,433 | B1 | 10/2014 | Rafii |
| 9,778,810 | B2 | 10/2017 | Bederson et al. |
| 10,004,991 | B2 | 6/2018 | Ceraldi et al. |
| 10,185,463 | B2 | 1/2019 | You et al. |
| 10,213,645 | B1 | 2/2019 | Wu |
| 10,744,412 | B2 | 8/2020 | Ceraldi et al. |
| 11,409,411 | B1 | 8/2022 | Levin |

(Continued)

*Primary Examiner* — Afroza Chowdhury
(74) *Attorney, Agent, or Firm* — Fish & Richardson P.C.

(57) ABSTRACT

Methods, systems, and apparatus, including medium-encoded computer program products, for controlling a virtual camera in a three dimensional environment displayed on a two dimensional touchscreen display include: presenting on the two dimensional touchscreen display a camera view into the three dimensional environment; receiving input indicating a single touch by a user on the two dimensional touchscreen display, the single touch including a slide across the two dimensional touchscreen display; and updating, in response to the input, the camera view into the three dimensional environment presented on the two dimensional touchscreen display, the updating including rotating the camera view in accordance with a first direction of the input across the two dimensional touchscreen display, and changing a distance of the camera view in accordance with a second direction of the input across the two dimensional touchscreen display.

20 Claims, 6 Drawing Sheets

(56) References Cited

U.S. PATENT DOCUMENTS

| | | | |
|---|---|---|---|
| 11,703,997 B2 * | 7/2023 | Levin | G06F 3/0304 345/173 |
| 2014/0325429 A1 | 10/2014 | Chang | |
| 2015/0040073 A1 | 2/2015 | Barcay | |
| 2015/0234572 A1 | 8/2015 | Arita | |
| 2016/0092080 A1 | 3/2016 | Swanson et al. | |
| 2017/0180680 A1 | 6/2017 | Yu | |

* cited by examiner

SINGLE FINGER USER INTERFACE CAMERA CONTROL

CROSS-REFERENCE TO RELATED APPLICATIONS

This application is a continuation application of and claims the benefit of priority to U.S. application Ser. No. 17/867,485, filed on Jul. 18, 2022, which is a continuation of U.S. application Ser. No. 17/200,655, filed on Mar. 12, 2021, now U.S. Pat. No. 11,409,411, the contents of which are hereby incorporated by reference.

BACKGROUND

Technical Field

This specification relates to user interfaces for mobile devices, such as for controlling a virtual camera in a three dimensional environment displayed on a two dimensional touchscreen display of a handheld mobile computing device.

Description of Related Art

Mobile computing devices, such as smartphones and tablet computers, have been used to display and enable interaction with three dimensional virtual environments, such as three dimensional game environments. In the context of games designed for mobile devices, frequently the user interface requires the mobile device to be in landscape viewing mode, where the device is held horizontally, to play the game. However, some games provide a user interface that will operate in either the landscape mode or the portrait viewing mode, where the device is held vertically, and some games have a user interface that requires the mobile device be held in the portrait mode. Further, touchscreen user interfaces that operate in portrait mode on smartphones require at least two fingers to control at least a zoom function of the user interface because pinch logic is used to control zooming in and out of the three dimensional environment.

SUMMARY

This specification describes technologies relating to user interfaces for controlling a virtual camera in a three dimensional environment displayed on a two dimensional touchscreen display of a handheld mobile computing device.

In general, one or more aspects of the subject matter described in this specification can be embodied in a handheld mobile computing device configured to perform one or more methods (and also one or more non-transitory computer-readable mediums tangibly encoding a computer program operable to cause data processing apparatus to perform operations) including: causing rendering of a user interface element in a portrait mode user interface of an application running on a handheld mobile computing device, wherein the portrait mode user interface is presented on a two dimensional touchscreen display of the handheld mobile computing device, the application presents a three dimensional environment on the two dimensional touchscreen display of the handheld mobile computing device, and the user interface element provides control of a camera view in the three dimensional environment, the camera view defining which portion of the three dimensional environment is shown on the two dimensional touchscreen display from which perspective in the three dimensional environment; receiving first input indicating a user's finger has made contact with the two dimensional touchscreen display within a boundary of the user interface element, and then receiving second input indicating the user's finger has slid across the two dimensional touchscreen display while the finger contact with the two dimensional touchscreen display is maintained; changing the camera view by rotating the camera view clockwise and counter-clockwise around a targeted location in the three dimensional environment responsive to the second input indicating movement of the finger right and left along a first axis of the user interface element; changing the camera view by zooming the camera view in and out from the targeted location in the three dimensional environment responsive to the second input indicating movement of the finger up and down along a second axis of the user interface element; and causing rendering of changes to which portion of the three dimensional environment is shown on the two dimensional touchscreen display from which perspective in the three dimensional environment, as defined by the camera view, responsive to changing the camera view while the second input is received.

One or more aspects of the subject matter described in this specification can also be embodied in a smartphone including: a touchscreen display; one or more processors coupled with the touchscreen display; and one or more memory devices encoding instructions that, when run on the one or more processors cause the one or more processors to render to the touchscreen display of the smartphone a portrait mode user interface showing a three dimensional environment and including a user interface element that provides control of a camera view in the three dimensional environment, the camera view defining which portion of the three dimensional environment is shown on the touchscreen display from which perspective in the three dimensional environment, receive first input indicating a user's finger has made contact with the touchscreen display within a boundary of the user interface element, receive second input indicating the user's finger has slid across the touchscreen display while the finger contact with the two dimensional touchscreen display is maintained, change the camera view by rotating the camera view clockwise and counter-clockwise around a targeted location in the three dimensional environment responsive to the second input indicating movement of the finger right and left along a first axis of the user interface element, change the camera view by zooming the camera view in and out from the targeted location in the three dimensional environment responsive to the second input indicating movement of the finger up and down along a second axis of the user interface element, and render changes to which portion of the three dimensional environment is shown on the touchscreen display from which perspective in the three dimensional environment, as defined by the camera view, responsive to changing the camera view while the second input is received.

These and other embodiments can optionally include one or more of the following features. Changing the camera view responsive to movement along the second axis can include changing a distance from the targeted location and a height above the targeted location for the camera view responsive to the second input indicating movement of the finger up and down along the second axis of the user interface element. Changing the camera view responsive to movement along the second axis can includes changing a pitch of the camera view in addition to the distance and the height.

Changing the camera view responsive to movement along the second axis can include changing the distance, the height, and the pitch of the camera in accordance with a function defined based on dimensions of the three dimensional environment. Changing the camera view responsive to movement along the second axis can include moving the targeted location toward a predefined location in the three dimensional environment as the distance is increased, the height is increased, and the pitch is lowered while the second input is received.

Changing the camera view responsive to movement along the first axis can include moving the targeted location toward the predefined location in the three dimensional environment as the camera view is rotated around the targeted location. Moving the targeted location toward the predefined location can be done when zooming out, but need not be done when zooming in, and need not be done when rotating without any zoom.

The predefined location in the three dimensional environment can be a location in three dimensional space where a ball is expected to hit an object in the three dimensional environment when the ball is struck. The user interface element can include first and second icons representing the first axis, third and fourth icons representing the second axis, and a fifth icon, the first input can indicate the user's finger has made contact with the fifth icon.

Further, the method can include, or the one or more memory devices can encode the instructions that (when run on the one or more processors) cause the one or more processors to perform operations including: changing a position of the fifth icon in relation to the first, second, third, and fourth icons responsive to the second input; and causing rendering on the touchscreen display of the position of the fifth icon as it is changed. Moreover, the first icon can be a clockwise circular arrow, the second icon can be a counter-clockwise circular arrow, the third icon can be a plus sign, the fourth icon can be a minus sign, and the fifth icon can represent a camera.

Various embodiments of the subject matter described in this specification can be implemented to realize one or more of the following advantages. The user interface for an application on a mobile computing device having a touch-screen can enable all interactions with the application in portrait mode (including zooming a camera view in and out within a three dimensional environment presented on the touchscreen) to be done using a single finger. Holding the mobile computing device (e.g., a smartphone) in portrait mode, the user interface allows the user of the device to hold the device with a single hand while also controlling rotation and zoom functions with a single finger (e.g., a thumb) of this same single hand. No pinch logic is needed for the zoom function. Thus, there is no need to hold the smartphone with one hand, and then use the fingers of the other hand to control the camera.

A user interaction to control the camera view in an application on a smartphone is made possible, where this approach to user control of the application (controlling the camera view with the same single hand that holds the smartphone) was not possible before and significantly simplifies user control of the application. Use of the application in locations where one's other hand is needed for other actions, such as holding onto a strap, pole or rail in a public transportation vehicle, or holding one's coffee, is facilitated. Moreover, the user interface increases comfort and flexibility when using the smartphone, as one hand is left entire free; there is no need to use two hands to control the rotation and zoom functions, meaning the smartphone held in one hand can be kept clean while the other hand is engaged in a messy task, such as eating popcorn (the screen of the smartphone is not made greasy by contact with the other hand).

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
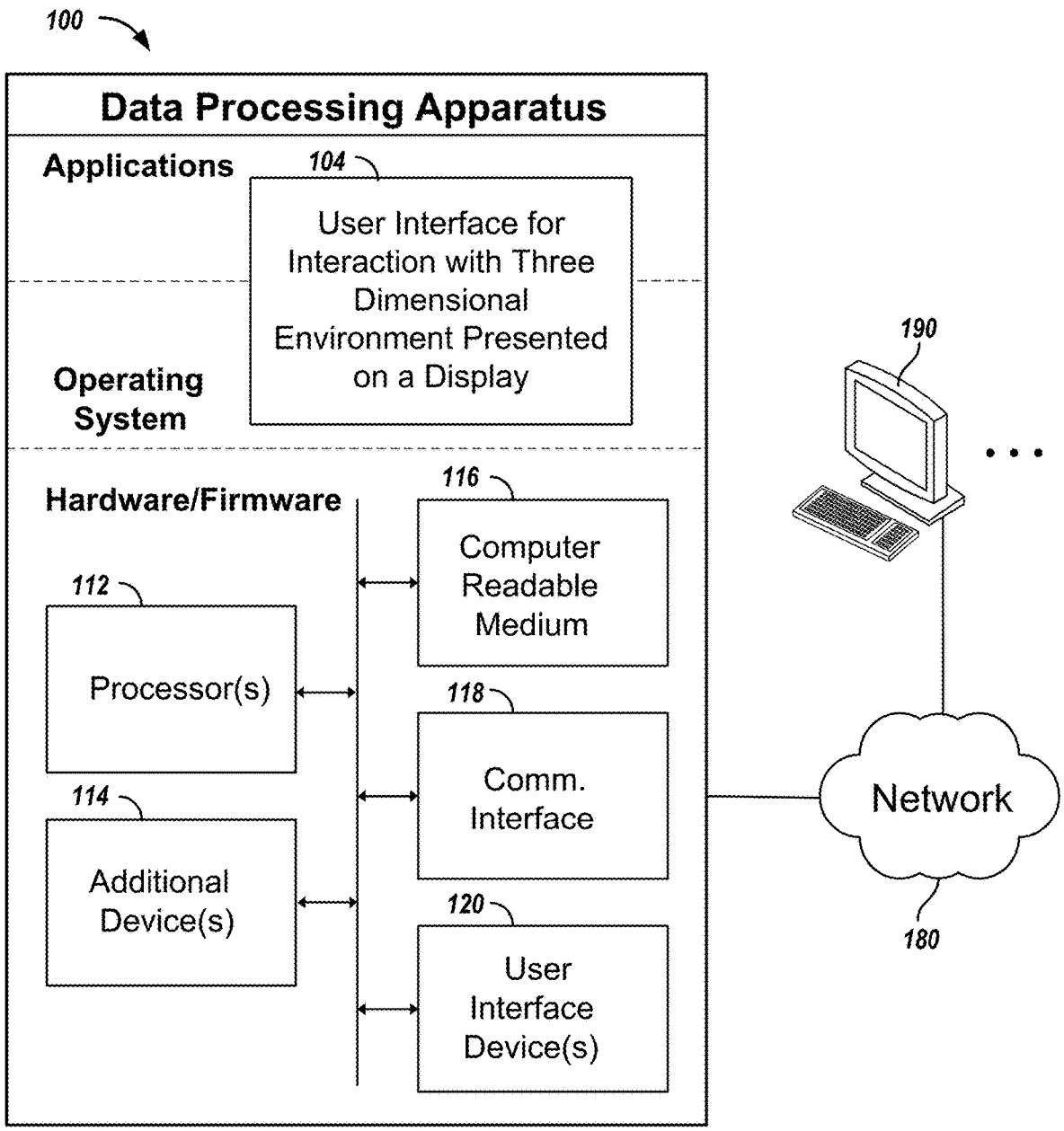
FIG. 1 is a schematic diagram of a data processing system including a data processing apparatus implementing a user interface for interaction with a three dimensional environment presented by the data processing apparatus.

FIG. 1 is a schematic diagram of a data processing system including a data processing apparatus 100 implementing a user interface 104 for interaction with a three dimensional environment presented by the data processing apparatus 100. The data processing apparatus 100 is connected with one or more computers 190 through a communications network 180, which can be a private network, a public network, a virtual private network, a peer-to-peer network, etc. For example, the data processing apparatus 100 can be a smartphone configured to communicate over both cell phone and WiFi networks 180.

The data processing apparatus 100 includes one or more software modules, which can be distributed between an applications layer and an operating system of the apparatus 100, where these software module(s) enable user interaction with a three dimensional environment presented by the data processing apparatus 100. For example, the data processing apparatus 100 can be a smartphone with a golfing application 104 installed thereon. Other types of applications or user interface programs 104 are also possible, e.g., a mapping application for use in route planning.

The data processing apparatus 100 includes hardware or firmware devices including one or more processors 112, one or more additional devices 114, a computer readable medium 116, and a communication interface 118, which is used to communicate with the one or more computers 190 over the network 180. Each processor 112 is capable of processing instructions for execution within the data processing apparatus 100, where these instructions include those used to implement the user interface, as described in this specification. In some implementations, the processor 112 is a single or multi-threaded processor. Each processor 112 is capable of processing instructions stored on the computer readable medium 116 or on a storage device such as one of the additional devices 114, e.g., a hard disk device, a solid state memory device, or a combination thereof. Further, in some implementations, the application 104 can operate using some instructions that run on processor(s) 112 and some instructions that run on processor(s) located in the one or more computers 190, e.g., the application 104 can operate as a client in a client-server computing system, including a combination of a back-end component, e.g., a data server, a middleware component, e.g., an application server, and a front-end component, e.g., a client computer having a graphical user interface or a Web browser through which a user can interact with an implementation of the subject matter described is this specification.

The data processing apparatus 100 also includes one or more user interface devices 120, which can be employed by the application 104 to interact with a user, as described in this specification. For example, a user interface device 120 can be a two dimensional touchscreen display of a mobile computing device, such as a smartphone, which serves as both an input and an output device 120 for the computing device 100. Other examples of user interface devices 120 include a camera, a speaker, and a microphone.

Figure 2:
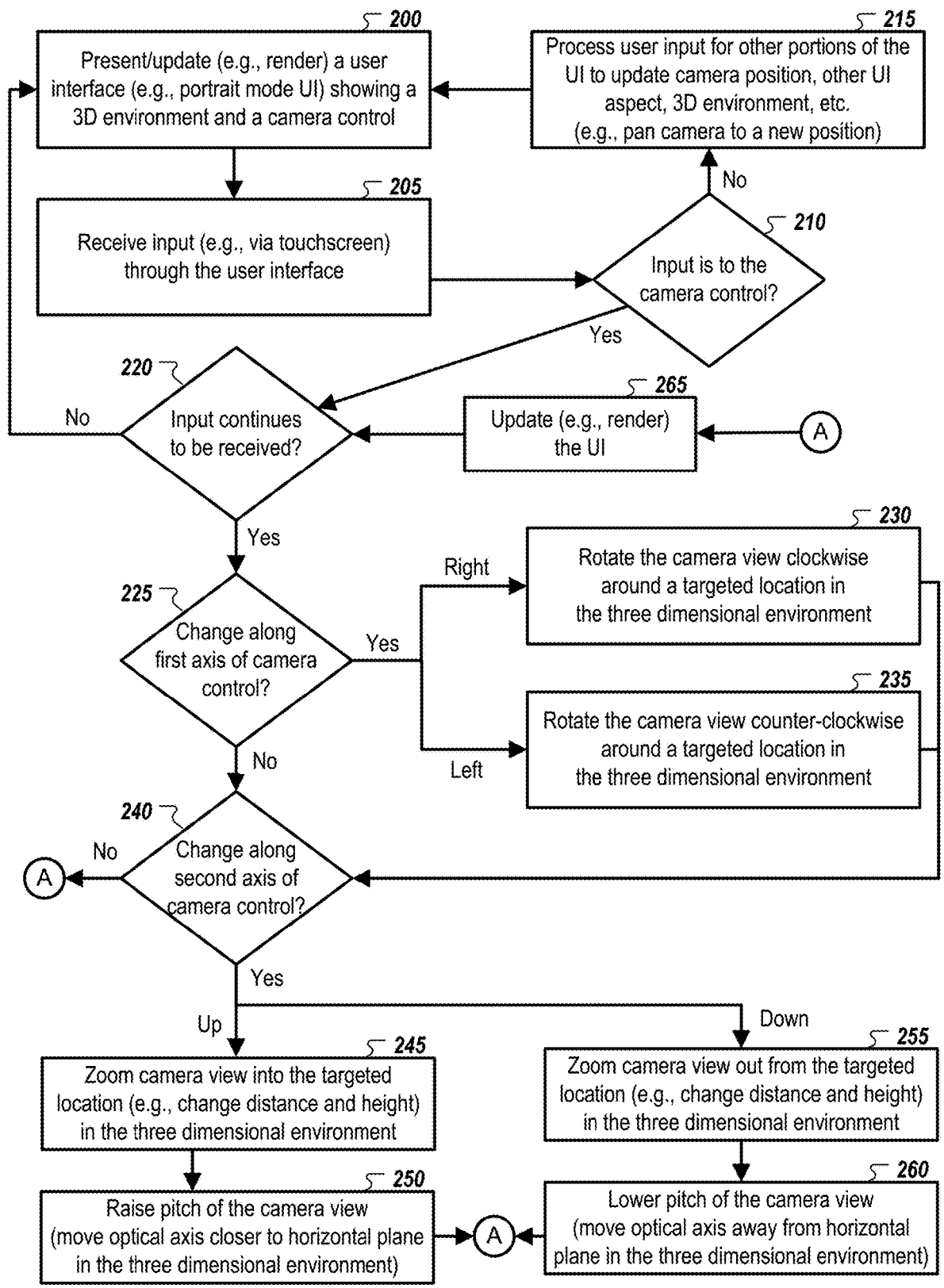
FIG. 2 is a flowchart showing an example of a process that provides user control over a camera view into a three dimensional environment.

FIG. 2 is a flowchart showing an example of a process (e.g., performed by the data processing apparatus 100) that provides user control over a camera view into a three dimensional (3D) environment. A user interface (UI) is presented 200, where the UI shows a 3D environment and a camera control for the presented view into the 3D environment. For example, the UI can be a portrait mode UI, e.g., on a smartphone designed primarily for portrait mode interactions, and a program providing the UI can cause the mobile computing device to render the UI to a touchscreen display of the mobile computing device.

Input is received 205 through the UI. This input can be received 205 using traditional hardware and operating system (OS) routines. For example, the input can be contact made by a user's finger with a touchscreen display of the mobile computing device. Also, the UI can provide various types of functionality for the user other than camera control. Thus, when it is determined 210 that the received input is not to the cameral control UI element described in this specification, the user input is processed 215 for other portions of the UI's functionality, and the UI can then be updated 200. Note that this processing 215 can include making updates to the camera position, other UI aspects, the 3D environment, etc. For example, the user input can be processed 215 to pan the camera to a new position.

Figure 3B:
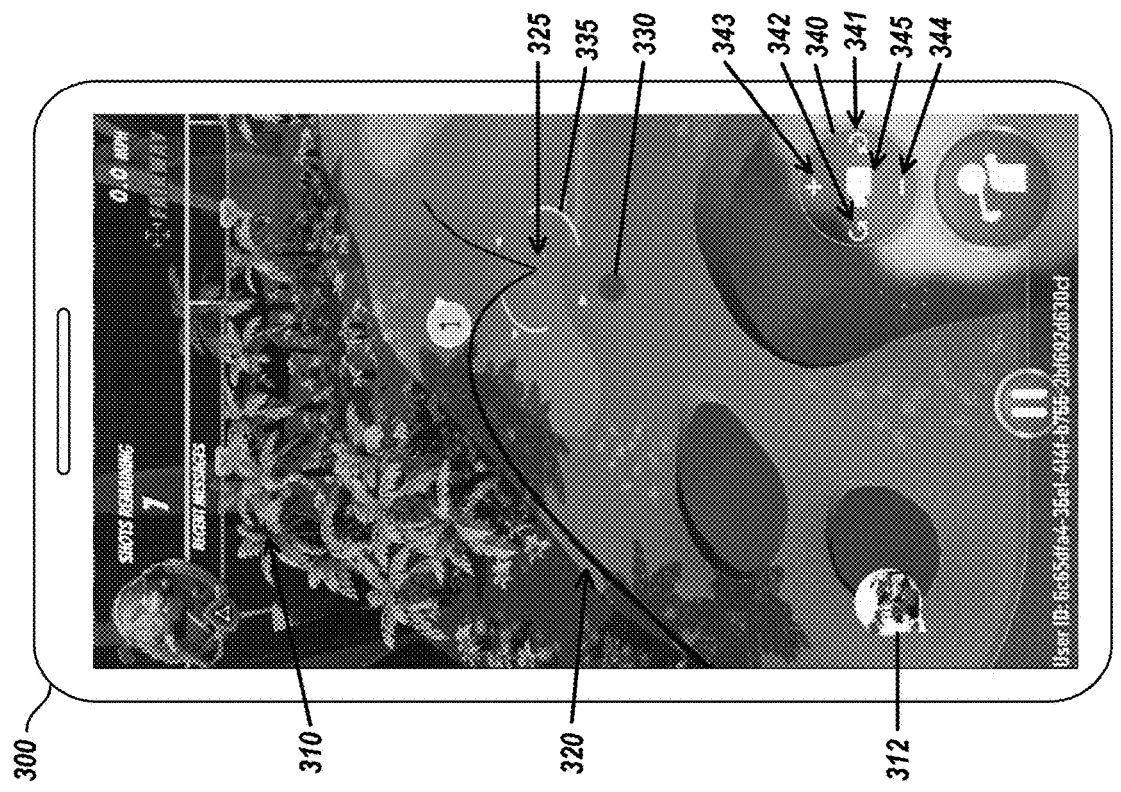
FIGS. 3A-3F show a smartphone display presenting an example of a user interface with user control over a camera view into a three dimensional environment.
Figure 3A:
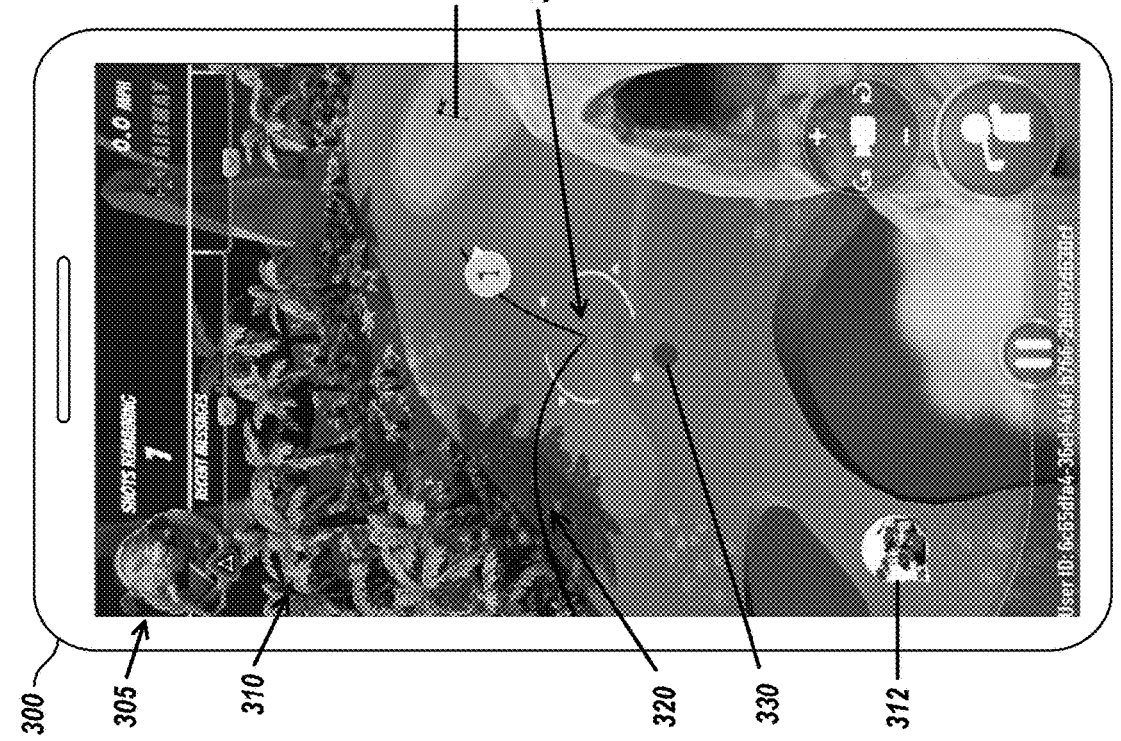

FIG. 3A shows an example of a smartphone 300 with a touchscreen display 305. Presented on the touchscreen display 305 is a 3D environment 310, which in this example is for a golf game. Thus, the 3D environment 310 includes a flag 315 marking a hole on a green of a golf course, an arc 320 (e.g., an animated arc 320) representing the expected trajectory of the golf ball (through the air) once it is hit from a tee location (not shown on the screen but having its location indicated spatially in the 3D environment 310 by player icon 312), and an expected first landing point 325 of the golf ball in the 3D environment 310 (in accordance with physics simulation of the ball's trajectory). The UI can be designed to allow panning the camera view to a new position by simply grabbing and moving the 3D environment 310 itself.

Thus, the user input can be from the user's finger touching 330 the screen 305 at a ground position, and then sliding the finger across the two dimensional (2D) touchscreen display 305 while the finger contact with the 2D touchscreen display is maintained. FIG. 3B shows the result of the user sliding the 3D environment 310 up and to the right on the display 305. As shown, the presented view into the 3D environment 310 has been changed by moving the camera view in the X and Y (width and length) dimensions of the 3D environment 310, which causes the first landing point 325 to shift to a new position on the screen 305 (while remaining in the same location in the 3D environment 310) and causes more of the arc 320 to be presented on the screen 305. Various other UI interface elements can be provided as well, such as an aimer UI element 335, which the user can grab (e.g., on one of the aimer's handles) and move (with the same single finger used to pan the 3D environment 310) to change the location of the first landing point 325 in the 3D environment 310. In some implementations, the UI also allows changing of the location 325 by double tapping the screen 305.

Furthermore, the UI includes an additional user interface element, e.g., camera control 340, that provides control of the camera view in the 3D environment. Returning to FIG. 2, the check 210 can involve determining that the user input begins within a boundary of a user interface element that provides more than one type of concurrent control of the camera view in the 3D environment, where the camera view defines which portion of the 3D environment is shown on the 2D touchscreen display, from which perspective in the 3D environment. When this occurs, an additional check 220 is performed to see if the user input continues to be received. While the user input continues to be received 220 (e.g., input is received that indicates the user's finger has slid across the touchscreen display while the finger contact with the display is maintained) various processes are performed in response to this user input.

When the continued user input indicates 225 change along a first axis of the camera control UI element, the process operates differently depending on the direction of the change along the first axis. When the input is to the right along the first axis, the camera view can be rotated 230 clockwise around a target location in the 3D environment. When the input is to the left along the first axis, the camera view can be rotated 235 counter-clockwise around the target location in the 3D environment. In some implementations, the direction-to-rotation mapping is reversed.

Further, when the continued user input indicates 240 change along a second axis of the camera control UI element, the process again operates differently depending on the direction of the change along the second axis. When the input is up along the second axis, the camera view can be zoomed 245 into a target location in the 3D environment, e.g., decreasing 245 both a distance from the targeted location and a height above the targeted location for the camera view responsive to the user input. When the input is down on the second axis, the camera view can be zoomed 255 out from the target location in the 3D environment, e.g., increasing 255 both the distance from the targeted location and the height above the targeted location for the camera view responsive to the user input. In some implementations, the direction-to-zoom mapping is reversed.

In addition, in some implementations, the tilt angle of the camera view can be changed at the same time, responsive to the input along the second axis. The pitch of the camera can be raised 250 in response to the input along the second axis indicating a zoom in; the optical axis of the virtual camera in the 3D environment is moved closer to the horizontal (X,Y) plane in the 3D environment. Likewise, the pitch of the camera can be lowered 260 in response to input along the second axis indicating a zoom out; the optical axis of the virtual camera in the 3D environment is moved away from the horizontal (X,Y) plane in the 3D environment.

Note that the changes along the first and second axes can occur simultaneously and the user input's impact on the two axes can be processed concurrently or in parallel. Likewise, the user is free to only make changes along each of the respective axes of the camera control individually and in sequence, e.g., zoom and then rotate, rather than zoom and rotate at the same time. In any case, while the changes to the camera view are made, the UI presented on the display is updated (e.g., rendered) 265 as the changes are made. Thus, the user can see the perspective changes for the 3D environment in real-time as the user manipulates the camera control UI element, and the user has full control of both zoom and rotation of the camera view into the 3D environment while providing input to the camera control UI element using a single finger of the same hand that holds the mobile computing device.

Returning to FIG. 3B, note that the first and second axes need not be explicitly shown in the camera control UI element 340. In some implementations, the camera control UI element 340 can include first and second icons (e.g., a clockwise circular arrow 341 and a counter-clockwise circular arrow 342) representing the first axis, and third and fourth icons (e.g., a plus sign 343 and a minus sign 344) representing the second axis. In addition, a fifth icon (e.g., a camera icon 345) can be included to provide a visible control point for the user input to select. Thus, the input within the boundary of the UI element 340 that triggers user control of the camera view can be input indicating selection of the fifth icon 345, which allows other control functions to be added to the UI element 340, such as allowing the UI element 340 to be grabbed at its border and moved to a new position in the user interface. Moreover, the camera control input can involve changing the position of the fifth icon 345 in relation to the first, second, third, and fourth icons 341-344, where this change in position is rendered to the display to provide visual feedback to the user of the camera control functionality as it is used.

Figures 3C, 3D:
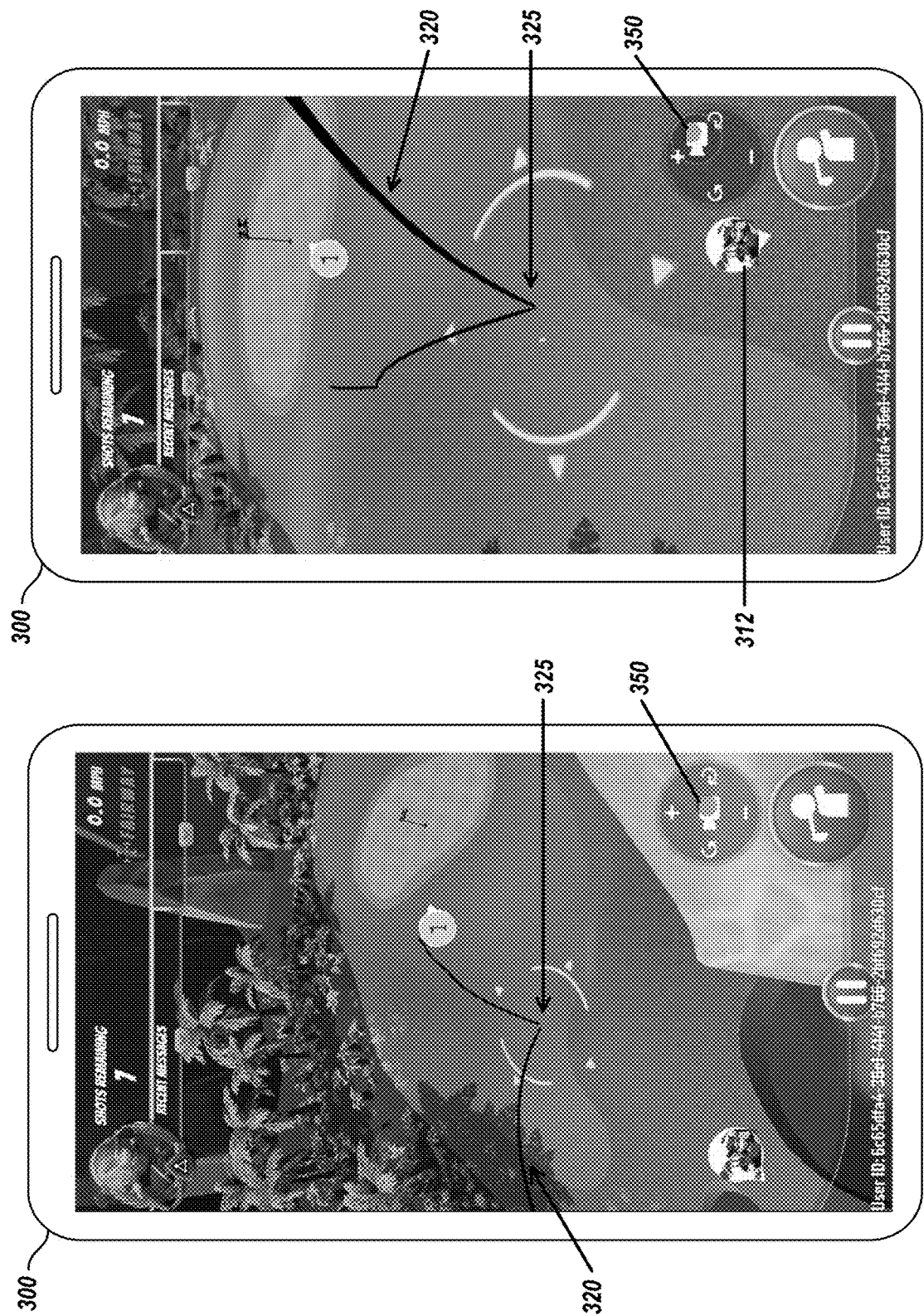

FIGS. 3C-3F show an example of this. As shown in FIG. 3C, a user activates the camera control UI by touching 350 the screen 305 at the fifth icon 345, and while this finger contact with the 2D touchscreen display 305 is maintained, the user slides her single finger in a chosen direction along one or both of the two axes. In the example shown, the user first slides her finger up and to the right, indicating a desire to zoom into the target location while simultaneously rotating clockwise around the target location. This change in perspective is shown in FIG. 3D, where the landing point 325 is now closer, and the arc 320 shows the rotated orientation in the 3D environment. Note that the player icon 312 also shows this change in orientation. Further note that the camera tilt has changed such that the camera pitch angle raises, which keeps more of the 3D environment (of interest to the user) in view on the screen as the user zooms in.

Figure 3F:
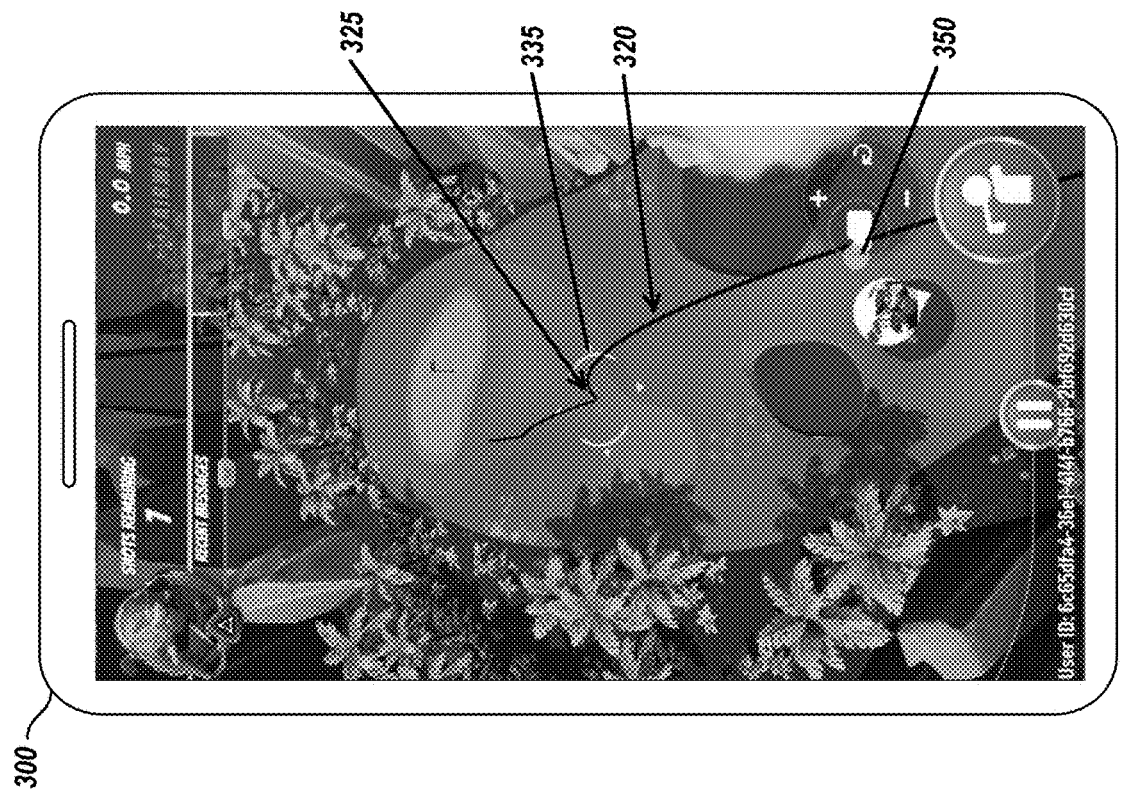
Figure 3E:
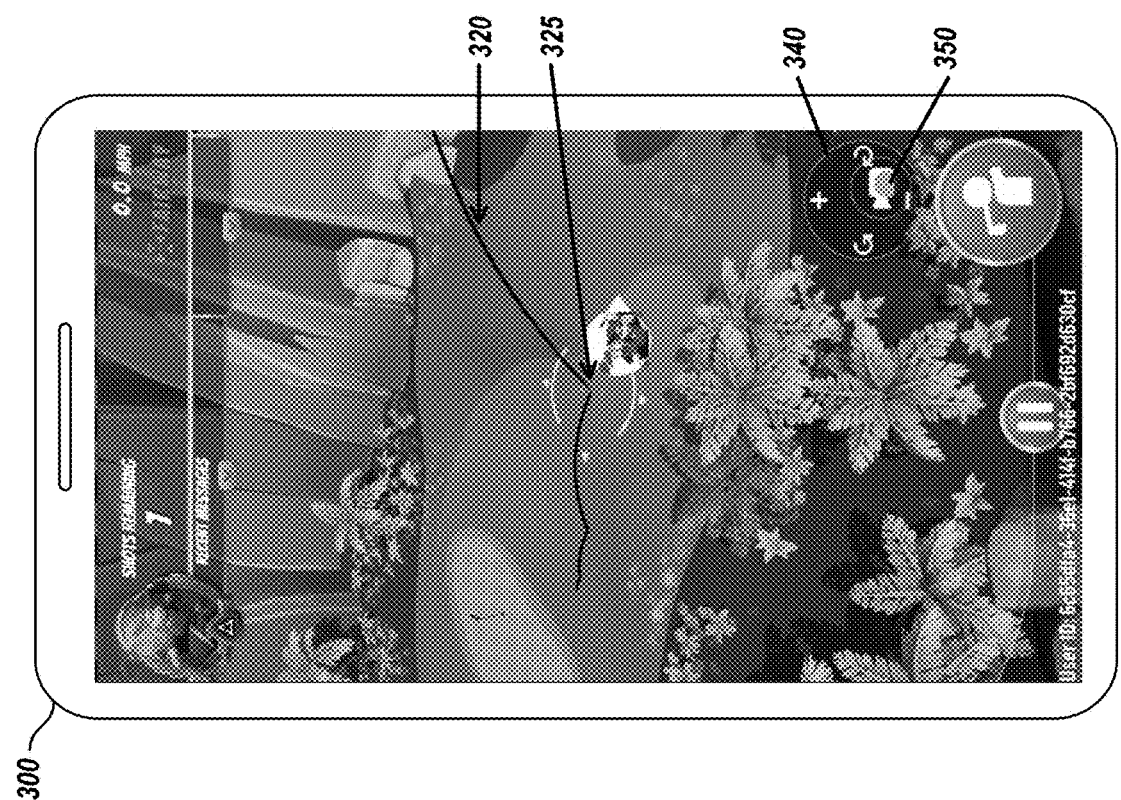

The user can then continue the clockwise rotation while changing to zooming out by sliding her finger down while staying to the right side of the camera control 340. FIG. 3E shows how the rendering of the camera control 340 is updated in response to this movement of the user's touch point 350. FIG. 3E also shows the resulting change in perspective: a further rotational change in orientation with respect to the 3D environment in combination with zooming out from the targeted location, where the zoom out includes both increasing the distance from and height above the targeted location and tilting the camera down to again keep more of the 3D environment (of interest to the user) in view on the screen.

Finally, as noted above, the user is free to move the touch point 350 in only a single axis at a time, allowing the user to both zoom in and out without making a rotation, and rotate left and right without changing the zoom amount. FIG. 3F shows an example where the user has kept the same zoom amount from that of FIG. 3E and has moved her touch point 350 to the left, thus causing a counter-clockwise rotation of the camera view around the targeted location. In some implementations, the distance of the touch point 350 (on each of the respective first and second axes) from the center of the camera control UI 340 controls the speed of the motion (for each of the rotation and zoom movements). The relationship between the distances and the movement speeds can be a linear relationship, or other functional relationships.

In the example of FIGS. 3A-3F, the targeted location is the ball's landing point 325, which can be repositioned using the aimer UI element 335, as noted above. But this need not be the case; other targeted locations can be used. For example, the center of the screen can be used as the anchoring point for zoom in/out, rather than the target landing point 325. In some implementations, a series of hot points can be defined (by the user through a UI and/or by the application itself) in the 3D environment, and then the user can be enabled to toggle through or select which of the hot points to use as the anchoring point for zoom in/out. Note that the this anchor point(s) for zoom in/out can be the same or different than those used for rotation, as discussed in further detail below.

Figure 4A:
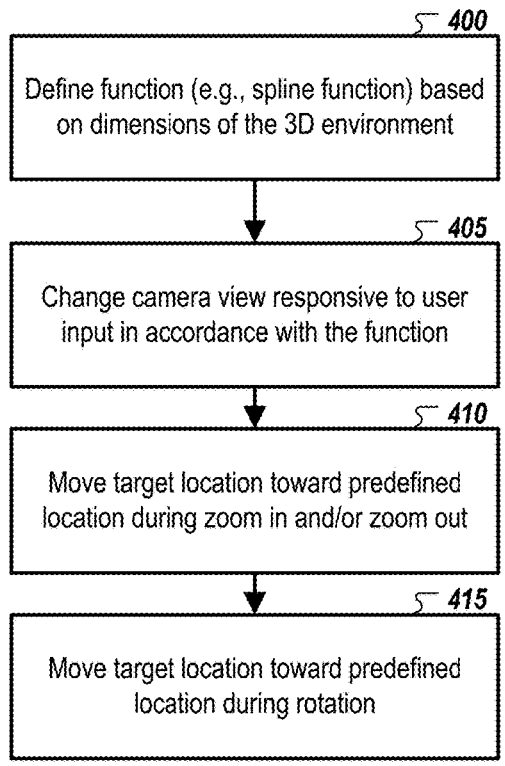
FIGS. 4A-4D show examples of camera path construction and modification for camera view movements.

In addition, in some implementations, changing the camera view responsive to the user input involves changing the distance, the height, and the pitch of the camera in accordance with a function (e.g., a spline, a parabola or other function) defined based on dimensions of the 3D environment. FIG. 4A is a flowchart showing an example of a process (e.g., performed by the data processing apparatus 100) of camera path construction and modification for camera view movements. In some implementations, a function is defined 400 for use in controlling camera view movements in the 3D environment in response to user input via the user interface. The function can be a spline (or other type of function definition) that is based on the dimensions of the 3D environment, i.e., defined in accordance with the overall size and shape of the terrain (e.g., a small hole versus a large hole in a golf game) to cause the camera to sweep back further, during zoom out in larger 3D environments, to provide a wider view to the user. For example, the function can be defined 400 to begin at or near the targeted location and end at or near a highest available point in the 3D environment at a horizontal distance from the targeted location that is a specified percentage (e.g., 50%-100%) of the smallest (or largest) size of the two horizontal dimensions. With this function defined for the targeted location in the 3D environment, the camera view is then changed 405 responsive to user input (as described herein) in accordance with the function.

Figure 4B:
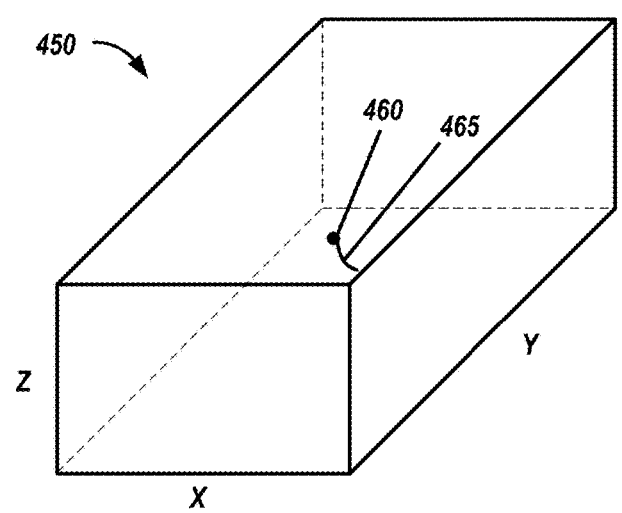

FIG. 4B shows an example of a 3D environment 450, which has predefined limits on the size of the three spatial dimensions: X (width), Y (length), and Z (height). Note that the 3D environment 450 can be long and narrow, which is typical for golf games, which makes the portrait mode UI described herein particularly advantageous since the user often wants to see the 3D environment stretched out in front of them on the display. As shown in FIG. 4B, a function 465 has been defined with respect to a targeted location 460. This function 465 can be used to determine 405 the distance and height of the camera view as the user input is received to change the zoom level, and this function 465 can be rotated around the targeted location 460 as the user input is received to rotate the camera view around the targeted location 460. Note that while this description focuses on a 2D function 465 that is rotated in 3D space, it will be appreciated that the function 465 can also be a 3D function.

Figure 4C:
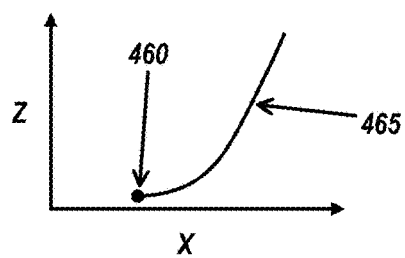

In some implementations, the function 465 also specifies the pitch angle of the camera view. FIG. 4C shows the function 465 in relation to just the X and Z dimensions for ease of presentation. The pitch angle (tilt) of the camera view can be determined 405 using the slope of the function 465 at the point on the function 465 where the camera is currently positioned. Thus, when the user zooms out, the camera view tilts down to provide a bird's eye view of the 3D environment, and when the user zooms in, the camera view tilts up until a person's view (while standing on the ground) is shown, e.g., the view of a golfer on a golf course. This automatically provides the user with a better view of the 3D environment as the user zooms in and out from the targeted location. Note that the amount of the change in the tilt can be more or less extreme in different implementations, and in some cases, the amount of the camera tilt change can be set based on the dimensions of the 3D environment and/or objects of interest in the 3D environment, e.g., by defining 400 the function accordingly.

In addition, in some implementations, the targeted location 460 can be moved as the user input is received. For example, the targeted location 460 can be set as the 3D point on the ground in the 3D environment that is currently in the center of the 2D view (of that 3D environment) presented on the display, and changing the camera view responsive to movement of the user input along the second axis of the camera control UI element can include moving 410 the targeted location toward a predefined location in the 3D environment during a zoom out, e.g., as the distance and height are increased in response to user input, the center of the 2D view can be moved toward the expected first landing point of the ball.

Figure 4D:
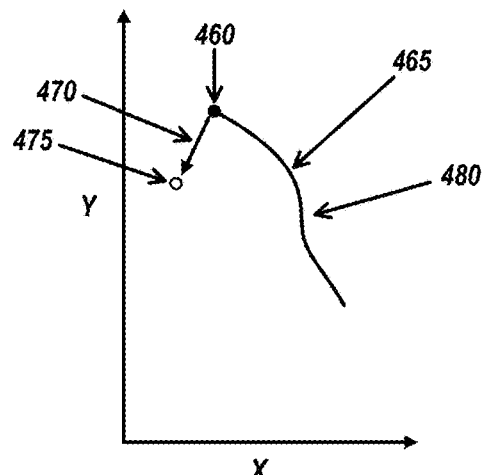

FIG. 4D shows an example of this, where the function 465 is shown in relation to just the X and Y dimensions for ease of presentation. As the zoom out input is received, the targeted location 460 is moved 470 toward a predefined location 475. This provides a functional advantage for the UI in that the user is free to move (pan) the camera view to a different location in the 3D environment, but as soon as the user begins to zoom out, the camera view automatically re-centers on the key point of interest in the 3D environment, e.g., on the aimer location 325. In some implementations, the movement 410, 470 of the targeted location 460 only occurs during zoom out, but does not occur during zoom in or during rotation.

Thus, the user can pan the camera view to a new location in the 3D environment, zoom into that location and rotate around it, but then readily find the key point of interest in the 3D environment by simply zooming out, all while providing continuous input with a single finger to the single camera control UI element. Note that this is very different from traditional pinch logic, where the zoom is done with respect to a location defined by wherever the user's two fingers happen to touch the screen. This approach provides a UI that facilitates full understanding and planning for a projected, multi-step path through a 3D environment (e.g., a round of golf, a multi-day backpacking trip, etc.) with an easy to use (intuitive) single finger control of both zoom and rotation. Other variations are also possible while still achieving the benefits of the improved UI. In some implementations, the movement 410, 470 of the targeted location occurs both during zoom out and during zoom in. Further, in some implementations, the targeted location is moved 415, 470 toward the predefined location in the 3D environment during rotation, e.g., as the camera view is rotated around the targeted location in response to user input, the center of the 2D view can be moved toward the expected first landing point of the ball. Note that additional changes can be made for the targeted location 460 in some implementations. For example, the UI can include an interface element that allows the user to modify the targeted location used by the camera control (e.g., allowing the user to switch the targeted location between the aimer location 325, the ground point in the 3D environment that is currently in the center of the screen, and potentially other objects or locations in the 3D environment). Additional options include providing an interface element in the UI that allows the user to modify when and how the targeted location is moved (with respect to the predefined location) by the UI in response to input indication camera rotation and/or camera zoom.

Moreover, the movements of the camera in response the user input (e.g., rotation of the function 465, change in position along the function 465, and/or movement of the targeted location 460) can be performed at a linear rate, using acceleration, using some combination of acceleration and deceleration, or using a custom function per movement type. Also, camera "springs" can be used to make the camera view changes feel to the user as though the camera control UI has some give to it, i.e., the camera view trails behind the control input a bit as the camera accelerates to match the control input, and then smooths to a stop when the user releases the camera control UI element (rather than immediately stopping as soon as input to the camera control ceases). Finally, other changes can be made to the transitioning camera view, e.g., using the defined function 465.

For example, the function 465 can be defined 400 by an algorithm that takes into account other aspects of the 3D environment, such as objects that the camera view should not pass through. Thus, as shown in FIG. 4D, the function 465 can be defined 400 to curve 480 around an obstacle (e.g., a tree, which is not shown) in the 3D environment, e.g., using collision detection techniques. Other examples include changing the yaw angle of the camera view in response to the user changing the zoom amount, e.g., turning the camera toward another predefined location of interest (such as the flag marking the hole on a golf course) as the camera view zooms out to help the user understand where the final objective is within the 3D environment.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. For example, the user interface element described in this specification can be operated using a mouse input device rather than a finger on a touchscreen display. Other kinds of devices can be used to provide for interaction with a user as well; for example, feedback provided to the user can be any suitable form of sensory feedback, e.g., visual feedback, auditory feedback, or tactile feedback; and additional input from the user can be received in any suitable form, including acoustic, speech, or tactile input.

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. Further, the actions recited in the claims can be performed in a different order and still achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are also possible and may be within the scope of the following claims. For example, rather than a gaming application presenting a three dimensional gaming environment, other applications and three dimensional environments are also possible, such as a mapping application presenting a three dimensional environment generated from satellite and road network data. Thus, the single finger control systems and techniques described in this document are usable with any 3D environment application or game (on a mobile device in portrait mode) having a camera in the 3D environment.

What is claimed is:

1. A method comprising:
presenting, on a two dimensional touchscreen display of a computing device, a camera view into a three dimensional environment;
receiving input indicating a single touch by a user on the two dimensional touchscreen display of the computing device, the single touch by the user comprising a slide across the two dimensional touchscreen display; and updating, in response to the input, the camera view into the three dimensional environment presented on the two dimensional touchscreen display of the computing device, wherein the updating comprising
rotating the camera view in accordance with a first direction of the input across the two dimensional touchscreen display, and
changing a distance of the camera view in accordance with a second direction of the input across the two dimensional touchscreen display.

2. The method of claim 1, wherein a current anchoring point, with respect to which the distance of the camera view is changed in response to the input, is selected from a series of anchoring points in the three dimensional environment, and the method comprises receiving additional input from the user to toggle through or select which of the series of anchoring points to use as the current anchoring point.

3. The method of claim 2, wherein the series of anchoring points are defined by the user through a user interface.

4. The method of claim 2, wherein the series of anchoring points are defined by an application providing the three dimensional environment.

5. The method of claim 1, wherein the updating comprises changing a height and a pitch of the camera view in accordance with the second direction of the input across the two dimensional touchscreen display.

6. A system comprising:
a two dimensional touchscreen display;
one or more processors coupled with the two dimensional touchscreen display; and
one or more memory devices encoding instructions that, when run by the one or more processors cause the one or more processors to
present a camera view into a three dimensional environment shown on the two dimensional touchscreen display,
receive input indicating a single touch by a user on the two dimensional touchscreen display, the single touch by the user comprising a slide across the two dimensional touchscreen display, and
update, in response to the input, the camera view into the three dimensional environment presented on the two dimensional touchscreen display of the computing device, wherein the update comprises rotating the camera view in accordance with a first direction of the input across the two dimensional touchscreen display, and changing a distance of the camera view in accordance with a second direction of the input across the two dimensional touchscreen display.

7. The system of claim 6, wherein a current anchoring point, with respect to which the distance of the camera view is changed in response to the input, is selected from a series of anchoring points in the three dimensional environment, and the instructions, when run by the one or more processors, cause the one or more processors to receive additional input from the user to toggle through or select which of the series of anchoring points to use as the current anchoring point.

8. The system of claim 7, wherein the series of anchoring points are defined by the user through a user interface.

9. The system of claim 7, wherein the series of anchoring points are defined by an application providing the three dimensional environment.

10. The system of claim 6, wherein the update uses a first anchoring point for rotating the camera view and a second anchoring point for changing the distance of the camera view, and the second anchoring point is separately changeable from the first anchoring point.

11. The system of claim 6, wherein the update comprises changing a height and a pitch of the camera view in accordance with the second direction of the input across the two dimensional touchscreen display.

12. The system of claim 11, wherein changing the distance, the height and the pitch of the camera view comprises changing the camera view in accordance with a function defined based on the three dimensional environment.

13. The system of claim 12, wherein the three dimensional environment represents a golf game comprising different holes, and the function is defined in accordance with an overall size and shape of a current one of the different holes being played in the golf game.

14. The system of claim 12, wherein the function is defined as a spline that curves around an obstacle in the three dimensional environment.

15. The system of claim 12, wherein the function is defined to adjust an amount of the pitch of the camera view based on one or more objects of interest in the three dimensional environment.

16. The system of claim 11, wherein the update comprises changing a yaw angle of the camera view, with respect to a location of interest in the three dimensional environment, in accordance with the second direction of the input across the two dimensional touchscreen display.

17. The system of claim 6, wherein the update comprises moving a targeted location, used for at least the rotating, toward a predefined location in the three dimensional environment at least when changing the distance of the camera view results in increasing the distance.

18. The system of claim 17, wherein moving the targeted location is done when rotating the camera view.

19. The system of claim 17, wherein the instructions, when run by the one or more processors, cause the one or more processors to modify the targeted location in response to additional user input.

20. The system of claim 17, wherein the instructions, when run by the one or more processors, cause the one or more processors to modify when and how the targeted location is moved in response to additional user input.

* * * * *